ELECTRICAL DEVICE HAVING DEADBAND RESPONSE CHARACTERISTIC

Filed Jan. 2, 1958 2 Sheets-Sheet 1

INVENTORS
WAYNE A. RING
ELWOOD J. MEYERS
BY Carlson, Pitzner, Hubbard & Wolfe
ATTORNEYS July 24, 1962 W. A. RING ETAL 3,045,917

ELECTRICAL DEVICE HAVING DEADBAND RESPONSE CHARACTERISTIC

Filed Jan. 2, 1958 2 Sheets-Sheet 2

INVENTORS
WAYNE A. RING
ELWOOD J. MEYERS
BY Carlson, Pitzner, Hubbard & Wolfe
ATTORNEYS 3,045,917
Patented July 24, 1962

3,045,917

ELECTRICAL DEVICE HAVING DEADBAND RESPONSE CHARACTERISTIC

Wayne A. Ring and Elwood J. Meyers, Rockford, Ill., assignors to Barber-Colman Company, Rockford, Ill., a corporation of Illinois Filed Jan. 2, 1958, Ser. No. 706,865
6 Claims. (Cl. 235—184)

Figure 1:
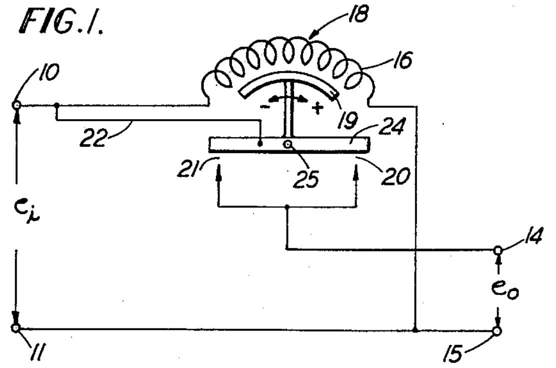

The present invention relates in general to arbitrary function generators, i.e., devices for producing an output signal which is related to the input signal in a predetermined, arbitrary manner. More particularly, this invention has to do with electrical devices having a deadband response characteristic, that is, no output signal so long as the input signal does not exceed a predetermined magnitude lying within a "deadband."

Such devices find a variety of useful application. For example, they are used in electrical analogue computers where their input and output signals may be made to simulate the relationship between interrelated physical conditions. As as illustration of such physical conditions, consider the relationship between the force applied to a frictionally retarded slidable member and the resulting acceleration of that member. As the force is gradually increased from a zero value, the member will not move, i.e., will have zero velocity, until the force reaches a value sufficiently great to overcome static friction. Then, however, the slidable member will accelerate without further increase in the force, and its acceleration will thereafter increase in proportion to increases in the force.

Dead band response devices may also be employed as components in specialized open or closed loop control systems. They are sometimes used, for example, to "filter" or eliminate responses to very small input signal variations in high gain control systems, since no output signal is produced until the input signal exceeds a predetermined magnitude.

The general aim of the invention is to provide an electric device having a deadband response characteristic, and which is characterized particularly in that it produces an abrupt step in the output signal at the ends of the deadband, thus more nearly simulating certain physical relationships, for example, the effects of dry friction in a pneumatic or hydraulic control system.

Another object of the invention is to bring about an electrical device having a deadband response characteristic, and in which the input signal forms the power source for producing the output signal. In other words, it is an objective here to provide such a device which requires no separate power supplies or amplifiers.

Another object of the invention is to provide such a device in which the magnitude of the aforementioned "step" in the output signal at the ends of the deadband may be quickly and easily adjusted; and in which the magnitude of the "steps" at the positive and negative ends of the deadband may be individually adjusted in magnitude.

Still another object is to provide such a device in which the width of the deadband may be readily adjusted; and in which the factor of proportionality relating the output signal to the input signal in the proportional band may be readily changed or adjusted.

A further object is to provide such a device having a deadband which may be either symmetrical or asymmetrical about the origin, and in which the width of the positive and negative portions of the deadband may be easily and quickly adjusted individually.

Finally, it is an important object of the invention to realize such an electrical device which functions reliably to produce a deadband response characteristic, and yet which requires only rugged, low cost components conveniently assembled into a relatively simple organization.

Figure 1A:
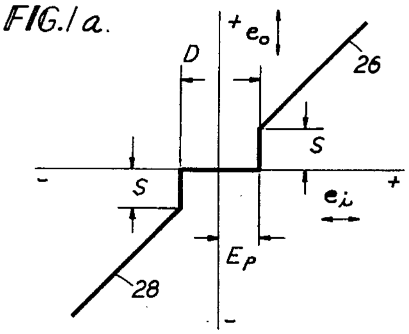
Figure 2:
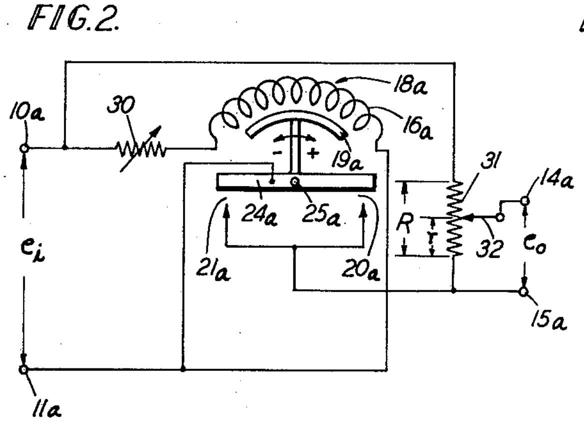
Figure 2A:
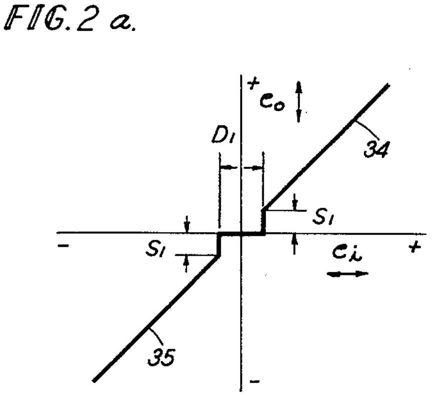
Figure 2B:
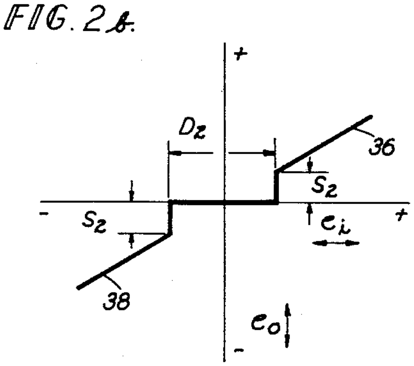
Figure 3:
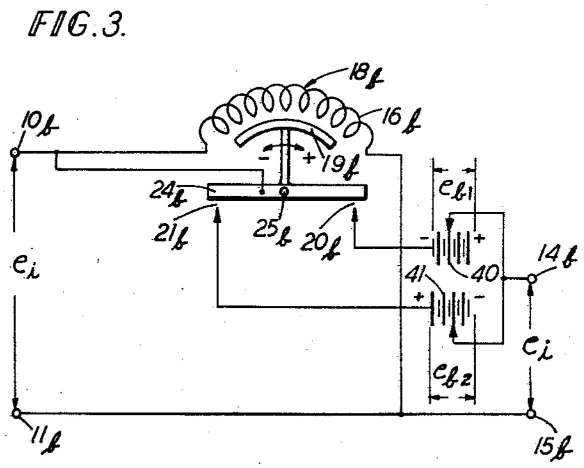
Figure 3A:
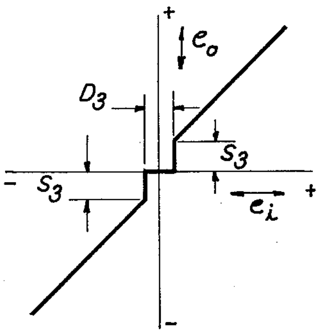
Figure 3B:
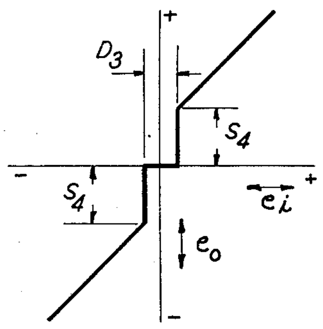
Figure 3C:
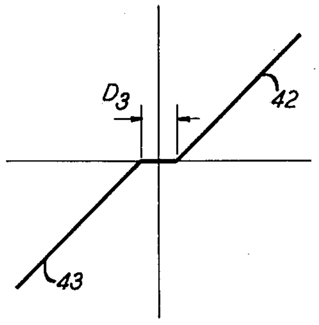
Figure 4:
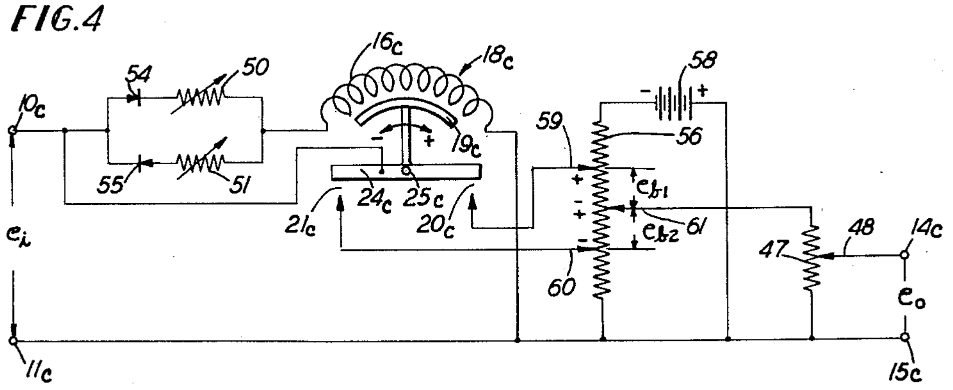
Figure 4A:
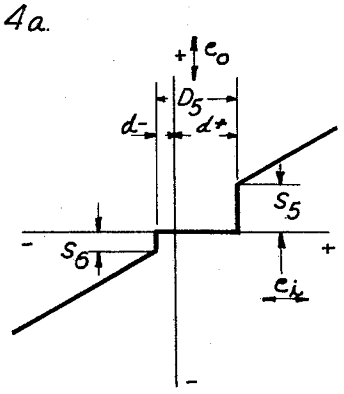
Figure 4B:
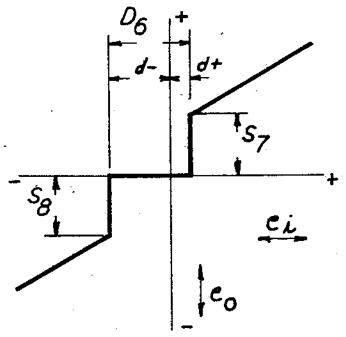

Other objects and advantages will become apparent as the following description proceeds, taken in conjunction with the accompanying drawings, in which:

FIGURE 1 is a schematic circuit diagram illustrating a basic embodiment of the invention;

FIG. 1*a* is a graphical illustration of a typical response characteristic for the device of FIG. 1;

FIG. 2 is a schematic circuit diagram of a second embodiment of the invention, particularly illustrating the manner in which the width of the deadband and the factor of proportionality in the linear band may be adjusted;

FIGS. 2*a* and 2*b* are graphical illustrations of response characteristics which may be obtained with different adjustments from the device illustrated in FIG. 2;

FIG. 3 is a schematic circuit diagram of a third embodiment of the invention, illustrating particularly one arrangement for changing the magnitude of "steps" in the response characteristic;

FIGS. 3*a*, 3*b* and 3*c* are graphical representations of response characteristics produced by the device illustrated in FIG. 3 with different adjustments;

FIG. 4 is a schematic circuit diagram of a fourth embodiment of the invention, disclosing a preferred arrangement for adjusting the magnitude of "steps" at the ends of the deadband, and an arrangement for effecting adjustments in the asymmetry of the response characteristic; and FIGS. 4*a* and 4*b* are graphical illustrations of typical response characteristics provided by the device of FIG. 4.

While the invention has been shown and will be described in some detail with reference to particular embodiments thereof, there is no intention that it thus be limited to such detail. On the contrary, it is intended here to cover all modifications, alterations and equivalents falling within the spirit and scope of the invention as defined by the appended claims.

Referring now to FIGURE 1, the device there illustrated as embodying the invention includes two input terminals 10, 11 adapted to receive an input voltage $e_i$ which is variable in magnitude and changeable in polarity. It may be assumed for present purposes of explanation that the input voltage $e_i$ is positive when it makes the input terminal 10 positive with respect to the input terminal 11. The device further includes two output terminals 14, 15 across which the output voltage $e_o$ appears. It will be noted in the present instance that the input terminal 11 and the output terminal 15 are common to one another, but this need not be so in other forms of the invention.

Connected across the input terminals 10 and 11 is a coil 16 of a polarized relay 18 which may be one of the various commercially available types. The relay has associated with its coil a movable armature 19 which is balanced in a central position when no voltage is across, and no current flows through the coil 16. A voltage across the coil of a predetermined magnitude and given polarity, and the resultant current flows through the coil in one direction will swing the armature 19 to close a first set of normally open contacts 20; while a voltage of opposite polarity applied to the coil and greater than a predetermined magnitude, resulting in current of greater than a predetermined value in the opposite direction through the coil, will swing the armature 19 in the opposite direction and close a second set of normally open relay contacts 21. It will be seen, therefore, that the polarized relay 18 is one which has a coil 16 and two sets of normally open contacts 20, 21 which are respectively closed in response to the application of a voltage of a predetermined magnitude and of one polarity or the other across the coil. For present purposes of explanation, it may be assumed that the input voltage $e_i$ must reach a magnitude of $E_p$ before sufficient current will flow through the coil 16 to close either the contacts 20 or 21.

In accordance with an important feature of the invention, the output voltage $e_o$ is held at zero value until the input voltage $e_i$ exceeds a predetermined magnitude, and is thereafter made to vary proportionally or linearly with the input voltage. For this purpose, the input terminals 10 and 11 are connected to the output terminals 14 and 15 by means which include the two normally open sets of contacts 20 and 21 in parallel. As shown in FIGURE 1, a conductor 22 leads directly from the input terminal 10 to a conductive member 24 which rocks about a pivot point 25 when the armature 19 is deflected from its balanced position. Depending upon the polarity of the input voltage, and thus upon whether the armature 19 rocks clockwise or counterclockwise, the contacts 20 or 21 will be closed. These two contacts lead from the input terminal 10 and the conductor 22 directly to the output terminal 14. Thus, the output voltage $e_o$ appearing across the terminals 14, 15 will be zero for so long as the input voltage does not exceed in magnitude the pick-up voltage $E_p$ for the relay 18. Once the input voltage increases beyond that magnitude, whether it be positive or negative, one of the contacts 20 or 21 will close, thus connecting the input terminal 10 to the output terminal 14, and making the output voltage $e_o$ vary directly with the input voltage $e_i$.

This response characteristic of the device shown in FIG. 1 will be more readily understood with reference to the graphical illustration of FIG. 1*a*. It will be seen that as the input voltage $e_i$ varies on either side of a zero value within a region D, the output voltage remains zero because neither of the contacts 20 nor 21 (FIG. 1) is closed. The region D is thus termed the "deadband" since there is no output signal. However, as soon as the input voltage $e_i$ exceeds the pick-up voltage $E_p$ for the relay 18, the contacts 20 or 21 will close, depending upon whether the input voltage is positive or negative. With this, the output voltage $e_o$ immediately becomes equal to the input voltage so that there is a step rise S in the output voltage. Thereafter, if the input voltage increases in magnitude, the output voltage will correspondingly increase, and have the same polarity, as illustrated by the graph portions 26 and 28 in FIG. 1*a*.

It is to be noted particularly at this point that the arrangement of FIG. 1 provides a stepped increase from zero volts to S volts in the output signal as the input voltage reaches the upper or lower limits of the deadband D. In the particular organization shown in FIG. 1, this step S will be equal in magnitude to the valve of the voltage necessary to actuate the relay 18, and thus will be equal to the pick-up voltage $E_p$.

This stepped rise in the output voltage results in a more exact simulation of certain physical phenomena. As an example, consider the relationship between the acceleration of a frictionally retarded slidable member and a force applied thereto. As the force (represented by the input voltage $e_i$ in FIG. 1*a*) is increased in either direction from zero, the movable member will have zero velocity (represented by the output voltage $e_o$) until the force exceeds the counteractive force of static friction. This is the "deadband." Then, as the force overcomes static friction, the retarding kinetic friction will be considerably less, so that will be a step increase in the acceleration of the movable. This is reflected by the step changes "S" at the ends of the deadband in FIG. 1*a*. Thereafter, if the force on the member is increased, its acceleration thereof will linearly increase, as simulated by the graph portions 26, 28. The entire relationship between force on and velocity of a frictionally retarded member is thus faithfully represented by the response characteristic of FIG. 1*a*.

FIGURE 2 illustrates a second embodiment of the invention intended to facilitate adjustments in the width of the deadband and the factor of proportionality relating the output voltage to the input voltage in the linear band. As shown, the arrangement of FIG. 2 includes input terminals **10*a*, 11*a* and output terminals 14*a*, 15*a*. The means for connecting the coil 16*a* of a polarized relay 18*a* across the input terminals 10*a*, 11*a* includes an element adjustable in resistance, and is here shown as a variable resistor 30 connected directly in series with the coil 16*a*. For connecting the input terminals 10*a*, 11*a* to the output terminals 14*a*, 15*a* two paralleled normally open sets of relay contacts 20*a*, 21*a* are connected in series between the input terminal 11*a* and the output terminal 15*a*. Those contacts are respectively closed whenever the current through the coil 16*a* exceeds a predetermined value and thus shifts the relay armature 19*a* in one direction or the other from its balanced position. By increasing or decreasing the effective value of the resistor 30, the magnitude of the input voltage necessary to create a current through the coil 16*a* sufficiently large to actuate the contacts of the relay 18*a* is correspondingly increased or decreased. Thus, the deadband, or range of input voltage magnitude which leaves the output voltage at zero, may be adjusted simply by appropriately setting the resistor 30**.

As previously mentioned, the input and output terminals **10*a*, 11*a* and 14*a*, 15*a* are connected together through means which include the paralleled normally open contacts 20*a* and 21*a*. Such interconnecting means as shown in FIG. 2 further include a potentiometer 31 having an adjustable wiper 32. The potentiometer is connected from the input terminal 10*a* to the output terminal 15*a*, while the wiper 32 is connected with the output terminal 14*a*. It will be seen, therefore, that with one of the two sets of contacts 20*a* or 21*a* closed, the output voltage $e_o$ will be related to the input voltage $e_i$ by a factor of proportionality which depends upon the setting of the potentiometer wiper 32. More specifically, the output voltage $e_o$ will be equal to the input voltage $e_i$ multiplied by the factor $r/R$ where $r$ equals the effective resistance of the potentiometer between the terminal 11*a* and the wiper 32, and where R equals the total resistance of the potentiometer 31**.

FIGS. 2*a* and 2*b* illustrate the effects of adjusting the variable resistor 30 and the potentiometer wiper 32. FIG. 2*a* shows the response characteristic of the device illustrated by FIG. 2 when the resistor 30 is adjusted to have a relatively low effective value, and when the wiper 32 is set at a relatively high position on the potentiometer 31 to make the ratio $r/R$ approximately equal to 1. With this, it will be seen that the deadband $D_1$, representing the maximum magnitude of the input signal $e_i$ which results in zero output voltage, is relatively narrow. With the resistor 30 having a low effective value, substantially the entire input voltage $e_i$ is effective across the relay coil **16*a*, so that the relay 18*a* will be actuated when the input voltage only slightly exceeds the pick-up voltage for that relay. Further, as shown by the graph portions 34 and 35, the output voltage $e_o$ is almost equal to the magnitude of the input voltage $e_i$ as the latter increases beyond the limits of the deadband. The graph portions 34 and 35** have slopes almost equal to 45°.

FIG. 2*b* represents the change in the response characteristic when the effective value of the resistor 30 has been increased, and the potentiometer wiper 32 moved to a lower position on the potentiometer 31. The effect of increasing the value of the resistor 30 is to cause the relay **18*a*** to be actuated only after the input voltage $e_i$ exceeds by a relatively great amount the pick-up voltage of the relay. Thus, the deadband $D_2$ shown in FIG. 2*b* is considerably wider than the deadband $D_1$ in FIG. 2*a*. Moreover, after the relay **18*a* has been actuated to close either the contacts 20*a* or 21*a***, further increases in the input voltage $e_i$ will result in proportional but smaller increases in the output voltage $e_o$. Thus the slope of the response characteristic in the linear regions as shown at 36 and 38 in FIG. 2*b* will be less than the slope of the response curve portions 34 and 35 in FIG. 2*a*. In each instance, however, there will be a step increase in the output voltage at the upper and lower limits of the deadband. As shown in FIG. 2*a*, the output voltage changes abruptly at $S_1$ to a value almost equal to the input voltage $e_i$ at the limits of the deadband $D_1$. By contrast, with the value of the resistor 30 increased and the wiper 32 moved to a lower point from the potentiometer 31, the step increase $S_2$ illustrated in FIG. 2*b* will not be so big as the step increase illustrated in FIG. 2*a*.

A third embodiment of the invention is illustrated by FIG. 3, and is generally similar to that shown in FIG. 1 except for the additional provision of means for adjusting the magnitude of the step increase in the output voltage which occurs as the input voltage reaches the upper and lower limits of the deadband. In the form shown by FIG. 3, the device includes input terminals 10*b*, 11*b* and output terminals 14*b*, 15*b*. The polarized relay 18*b* has its coil 16*b* connected across the input terminals, and includes two sets of normally open contacts 20*b* and 21*b* which are respectively closed when the voltage across the current through the coil 16*b* exceed predetermined values in one direction or the other. The output voltage $e_o$ appearing betwen the terminals 14*b* and 15*b* will thus be zero for so long as the input voltage does not exceed in magnitude the value required to actuate the relay 18*b*.

In accordance with an important feature of the invention, means are provided to control and permit adjustments in the magnitude of the step change which occurs in the output voltage as the input voltage increases beyond limits of the deadband. As illustrated by FIG. 3, this is done in the present instance by providing two means for creating biasing voltages in series individually with the respective relay contacts 20*b* and 21*b*, the latter being in parallel and forming means for interconnecting the input and output terminals, as previously described. Such means for creating biasing voltages are here illustrated in FIG. 3 as potential sources or batteries 40 and 41 which are arranged, in any well known manner, to provide variable effective voltages.

The effect of including such batteries individually in series with the relay contacts 20*b* and 21*b* is to cause the output voltage $e_o$ to be the algebraic sum of the input voltage $e_i$ and the biasing voltage $e_{b1}$ provided by the battery 40 whenever the contacts 20*b* are closed. In like manner, the output voltage $e_o$ will be the algebraic sum of the input voltage $e_i$ and the biasing voltage $e_{b2}$ created by the battery 41 whenever the relay contacts 21*b* are closed. If the battery 40 is given the polarity indicated in FIG. 3, it will add to the value of the output voltage $e_o$ whenever the input voltage $e_i$ is positive and the contacts 20*b* are closed. Thus, as illustrated in FIG. 3*a*, the output voltage $e_o$ will increase abruptly to a relatively great value $S_3$ as the input voltage $e_i$ increases positively beyond the deadband $D_3$. Correspondingly, as shown in FIG. 3*a*, if the battery 41 is given the polarity indicated in FIG. 3, the output voltage $e_o$ will increase abruptly to a relatively great value $S_3$ as the input voltage $e_i$ increases negatively through the deadband region and causes closure of the contacts 21*b*.

FIG. 3*b* illustrates the response characteristic which would be obtained from the device illustrated in FIG. 3 if the batteries 40 and 41 are adjusted to provide biasing voltages $e_{b1}$ and $e_{b2}$ of still greater magnitude. It will be seen that abrupt steps $S_4$ of still greater magnitude are obtained as the input voltage increases positively or negatively beyond the limits of the deadband $D_3$.

The versatility of the arrangement shown in FIG. 3 is highlighted by the response characteristic, illustrated by FIG. 3*c*, which is obtained if the polarities of the batteries 40 and 41 shown in FIG. 3 are reversed, and adjusted to provide biasing voltages which are approximately equal to the input voltage necessary to actuate the relay 18*b*. Under those circumstances, whenever the relay 18*b* is actuated, the biasing voltages $e_{b1}$ or $e_{b2}$ would cancel the input voltage $e_i$, so that even though the contacts 20*b* or 21*b* are closed, the output voltage $e_o$ would remain zero. Then as the input voltage is increased further either positively or negatively beyond the limits of the deadband $D_3$, the output voltage will similarly increase positively or negatively as shown at 42 and 43. It may be noted in this connection that by individually adjusting the magnitude of the two biasing voltages $e_{b1}$ and $e_{b2}$, as well as individually selecting their polarities, the positive step in the output voltage occurring at the positive limit of the deadband may be made to be of different magnitude than the negative step which will occur in the output voltage at the negative end of the deadband. Thus, a highly flexible arrangement regarding the adjustment of the abrupt steps in the output characteristic is made available by the device shown in FIG. 3.

FIG. 4 illustrates a preferred embodiment of the invention incorporating all of the features discussed above and characterized further in that the deadband may be selectively adjusted to be symmetrical or asymmetrical about the zero point, and in that the adjustable biasing voltages for varying the positive and negative steps in the output voltage at the upper and lower limits of the deadband are created by a relatively simple arrangement requiring but a single voltage source or battery.

In the exemplary arrangement, illustrated by FIG. 4, a polarized relay 18*c* is employed having a coil 16*c*, an armature 19*c*, and two sets of normally open contacts 20*c* and 21*c* which are respectively closed when currents of greater than a predetermined magnitude flows in one direction or the other through the coil. The coil 16*c* is connected across input terminals 10*c*, 11*c* by means including circuit elements which individually determine the magnitude of current flow through the coil for a given magnitude of the input voltage $e_i$ when the latter voltage is positive or negative. As here shown, two adjustable resistors 50 and 51 and diodes 54, 55 are connected in parallel and then connected in series with the relay coil 16*c* between the input terminals 10*c* and 11*c*. To block current flow through a different one of the two resistors 50 and 51 when the input voltage is respectively positive or negative, means such as diodes 54 and 55 are individually connected in series with those resistors. The diodes 54 and 55 are oppositely poled, so that the former conducts only when input voltage is positive, and the latter conducts only when the input voltage is negative. Therefore, the value of the resistor 50 determines the positive magnitude which the input voltage $e_i$ must reach before the relay 18*c* is actuated to close the contacts 20*c*; and the value of the resistor 51 controls the magnitude which the input voltage must reach when it is negative before the relay 18*c* will be actuated and the contacts 21*c* closed. It will be apparent, therefore, that the width of the deadband in the response in a positive direction from zero will be determined by the setting of the resistor 50. In like manner, the width of the deadband in a negative direction from zero will be determined by the setting of the resistor 51. By making the resistors 50 and 51 have equal values, a symmetrical output characteristic will be obtained. However, by differentially adjusting the values of these resistors, an asymmetrical output characteristic may be obtained.

In order to derive the output voltage $e_o$ from the input voltage $e_i$ the input terminals 10*c* and 11*c* are respectively connected to the output terminals 14*c*, 15*c* through means which include the normally open contacts 20*c* and 21*c* in parallel. And as previously described with reference to FIG. 2, such means further include a potentiometer 47 having a wiper 48 which permits adjustments in the factor of proportionality relating the input and output voltages in the linear band. Moreover, to vary the magnitude of the output voltage steps at the upper and lower limits of the deadband, means are included in series with the two contacts 20*c* and 21*c* for producing biasing voltages which may be adjusted in magnitude and polarity. For this latter purpose, as shown in FIG. 4, a potentiometer 56 is energized from a suitable voltage source such as aa battery 58. The potentiometer has three adjustable wipers 59, 60 and 61. The contacts 20c and 21c are respectively connected to the wipers 59 and 60, while the third wiper 61 leads through the potentiometer 47 and the wiper 48 to the output terminal 14c.

When the relay 18c is actuated to close the contacts 20c a series circuit is established from the input terminal 10c through the contacts 20c, the wiper 59, and a portion of the potentiometer 56 between the wiper 59 and the wiper 61. The battery 58 establishes a biasing voltage $e_{b1}$ across this portion of the potentiometer 56, and such biasing voltage is algebraically combined with the value of the input voltage $e_i$ to create the voltage appearing across the potentiometer 47, a selected portion of which appears between the terminals 14c and 15c as the output voltage $e_o$. In like manner, when the contacts 21c are closed, a series circuit will be established from the input terminal 10c through the contacts 21c, the wiper 60, a portion of the potentiometer 56 between the wipers 60 and 61, and through the potentiometer 47 to the input terminal 11c. Thus, the output voltage $e_o$ will be determined by the algebraic sum of the input voltage $e_1$ and a biasing voltage $e_{b2}$ which appears across the potentiometer portion between the wipers 60 and 61.

By relatively adjusting the positions of the wipers 59 and 60, any desired value of the biasing voltage $e_{b1}$ may be obtained; and by then adjusting the position of the wiper 60 relative to the wiper 61, the desired value of the biasing voltage $e_{b2}$ may be obtained. Thus, a very simple and convenient circuit is provided for relatively adjusting the magnitudes of the positive and negative steps of the output voltage which occur at the upper and lower limits of the deadband.

FIGS. 4a and 4b graphically illustrate for purposes of comparison two typical output characteristics which may be established by different settings of the adjustable resistors 50 and 51. FIG. 4a shows an output characteristic which will result when the resistor 50 is adjusted to have a higher value than the resistor 51. Under these circumstances, as the input voltage $e_i$ increases from zero in a positive direction, the diode 55 will be non-conductive, so that the resistor 50 controls the magnitude of current flow through the relay coil 16c. Because the resistor 50 has a relatively high value, the input voltage $e_i$ must reach a relatively large positive magnitude before the relay 18c will be actuated. Thus, a positive portion $d+$ of the over-all deadband $D_5$ will be made to have a relatively great width. On the other hand, as the input voltage $e_i$ increases from zero in a negative direction, the diode 54 will be non-conductive, so that the resistor 51 is effective in controlling the magnitude of the input voltage necessary to actuate the relay 18c and close the contacts 21c. Since the value of the resistor 51 is assumed to be relatively low, a negative portion $d-$ of the deadband $D_5$ is relatively narrow in width. Thus, as asymmetric response characteristic is obtained.

FIG. 4b illustrates the asymmetric characteristic which would be obtained if the resistor 50 is adjusted to have a lower value than the resistor 51. Under these circumstances, the positive portion $d+$ of the over-all deadband $D_6$ is narrower in width than the negative portion $d-$. The response characteristic is asymmetric with the predominant portion of the deadband being in the negative region.

FIG. 4a also illustrates abrupt positive and negative steps $S_5$ and $S_6$ in the output voltage $e_o$ at the limits of the deadband $D_5$. The magnitude of these abrupt voltage steps is determined by the magnitude of the biasing voltages $e_{b1}$ and $e_{b2}$ established by the settings of the potentiometer wipers 59, 60 and 61. Shown in FIG. 4a are relatively small steps $S_5$ and $S_6$ which would be obtained from relatively low biasing voltages $e_{b1}$ and $e_{b2}$ obtained by spacing the potentiometer wipers 59 and 60 relatively close to the wiper 61. By contrast, FIG. 4b illustrates the output characteristic which would be obtained if the potentiometer wipers 59 and 60 were more widely spaced from the wiper 61 so as to increase the magnitude of the biasing voltages $e_{b1}$ and $e_{b2}$. Under these circumstances, positive negative steps $S_7$ and $S_8$ in the output voltage occur at the limits of the deadband $D_6$, and these steps are of greater magnitude than the steps $S_5$ and $S_6$ illustrated in FIG. 4a.

From the foregoing, it will be apparent that a very flexible and versatile electrical device for creating a deadband response characteristic is made possible by the present invention. In each of the embodiments described, no vacuum tube amplifiers or separate power sources are required to generate the voltage $e_o$. The output voltage is derived entirely from the input voltage $e_i$, except for small biasing voltages which may be created in a variety of convenient ways. Secondly, the device of the present invention makes possible the creation of a response characteristic which includes step increases in the magnitude of the output voltage at the ends of the deadband, the amplitude of these step increases being individually and conveniently adjustable. Thirdly, the invention makes possible such a deadband response characteristic device in which the width of the deadband is readily adjusted over a relatively wide range, and in which the widths of the positive and negative portions of such deadband may be individually adjusted to obtain an asymmetric output characteristic. Finally, the factor of proportionality which relates the output voltage to the input voltage in the linear regions outside of the deadband may be readily and simply changed. Yet, the invention may be practiced and its advantages realized from arrangements which require only standard components such as polarized relays, variable resistors, potentiometers and the like.

We claim as our invention:

1. An electrical device having a deadband response characteristic comprising, in combination, a pair of input terminals and a pair of output terminals, a polarized relay having a coil and two sets of normally open contacts which are respectively closed in response to current flow of a predetermined magnitude in one direction or the other through said coil, an adjustable resistor connected in series with said coil across said input terminals, means including said normally open contacts in parallel for connecting one of said input terminals to one of said output terminals, and means connecting the other input terminal to the other output terminal whereby adjustments in said resistor correspondingly change the width of the deadband in the response characteristic of the device.

2. An electrical device having a deadband response characteristic comprising, in combination, a pair of input terminals and a pair of output terminals, a polarized relay having a coil and two sets of normally open contacts which are respectively closed in response to current flow of a predetermined magnitude in one directon or the other through said coil, means including two adjustable resistors connected in parallel for connecting said relay coil across said input terminals, said last means including two means connected individually in series with respective ones of said two resistors for respectively blocking current flow when an input voltage applied to said input terminals is positive or negative, means including said normally open contacts in parallel for connecting one of said input terminals to one of said output terminals, and means connecting the other input terminal to the other output terminal whereby adjustments of said two resistors correspondingly change the width of the positive and negative portions of the deadband in the response characteristic of the device.

3. An electrical device having a deadband response characteristic comprising, in combination, a pair of input terminals and a pair of output terminals, a polarized relay having a coil and two sets of normally open contacts which are respectively closed in response to the application of a predetermined voltage of one polarity or the other across said coil, means connecting said coil across said input terminals, means including said two sets of normally open contacts in parallel for connecting one of said input terminals to one of said output terminals, said last means including means connected in series with at least one set of said contacts for creating a biasing voltage, and means for connecting the other input terminal to the other output terminals, whereby upon closure of said one set of contacts, the voltage at said output terminals is proportional to the algebraic sum of the biasing voltage and the voltage applied to said input terminals.

4. An electrical device having a deadband response characteristic comprising, in combination, a pair of input terminals adapted to receive thereacross an input voltage of variable magnitude and polarity, a pair of output terminals, a polarized relay having a coil and first and second sets of normally open contacts which are respectively closed in response to the application of a predetermined voltage of one polarity or the other across said coil, means connecting said coil across said input terminals, means including said first and second contacts in parallel for connecting one of said input terminals to one of said output terminals, said last-named means including first and second means connected individually in series with said first and second contacts, respectively, for creating first and second biasing voltages and means for connecting the other input terminal to the other output terminal.

5. An electrical device having an input versus output voltage response characteristic with an adjustable deadband and adjustable steps between the limits of the deadband and the region of linear variation, said device comprising the combination of a pair of input terminals adapted to receive an input voltage of variable magnitude and changeable polarity, a pair of output terminals, a polarized relay having a coil and first and second sets of normally open contacts which are respectively closed in response to current flow of a predetermined magnitude in one direction or the other through said coil, means including an element adjustable in resistance for connecting said coil across said input terminals, means including said first and second contacts in parallel for connecting one of said input terminals to one of said output terminals, first and second means connected individually in series with said first and second contacts for creating first and second biasing voltages adjustable in magnitude, and means for connecting the other input terminal to the other output terminal whereby adjustment of said resistance element changes the width of the deadband and adjustment of said biasing voltage means changes the magnitude of the steps in the response characteristic of the device.

6. An electrical device having an input versus output voltage response characteristic with an adjustable deadband and adjustable steps between the limits of the deadband and the linear regions, said device comprising the combination of a pair of input terminals adapted to receive an input voltage of variable magnitude and changeable polarity, a pair of output terminals, a polarized relay having a coil and first and second sets of normally open contacts which are respectively closed in response to current flow of a predetermined magnitude in one direction or the other through said coil, means including two adjustable resistors in parallel for connecting said coil across said input terminals, two diodes oppositely poled and connected in series with respective ones of said resistors, a potentiometer, a voltage source connected across said potentiometer, first second and third adjustable wipers engaging said potentiometer, means connecting one of said input terminals through said first and second contacts respectively to said first and second wipers, means for effectively connecting said third wiper to one of said output terminals, and means for connecting the other said input terminal to the other said output terminal.

References Cited in the file of this patent

UNITED STATES PATENTS

| | | |
|---|---|---|
| 923,700 | Pierce | June 1, 1909 |
| 2,203,888 | Asworth | June 11, 1940 |
| 2,992,366 | Veltfort | July 11, 1961 |

OTHER REFERENCES

Electronics (Morrill et al.), November 1952, pages 122–126.

Johnson: Analog Computer Techniques, McGraw-Hill Book Co., New York, 1956, pages 108 and 120.